United States Patent [15] 3,680,081
Richards [45] July 25, 1972

[54] NUMERICAL CONVERSION

[72] Inventor: Philip C. Richards, Geneva, Ill.

[73] Assignee: Bell Telephone Laboratories, Incorporated, Murray Hill, N.J.

[22] Filed: Dec. 23, 1969

[21] Appl. No.: 887,606

[52] U.S. Cl. ....................340/347 DD, 235/155, 444/1
[51] Int. Cl. ....................H03k 13/24
[58] Field of Search ....................340/347 DD; 235/154, 155

[56] References Cited

UNITED STATES PATENTS 3,349,230 10/1967 Hartwell et al. ....................235/92 DE
3,248,726 4/1966 Sonnenfeldt....................340/347 P
3,518,660 6/1970 Nicklas et al. ....................235/154 X

*Primary Examiner*—Maynard R. Wilbur
*Assistant Examiner*—Joseph M. Thesz, Jr.
*Attorney*—R. J. Guenther and William L. Keefauver

[57] ABSTRACT

Conversion apparatus and methods for converting two-out-of-six digital code signals into binary code signals. The numerical value of the positions of the two "1's" in the two-out-of-six code signals are added together, along with a constant, shifted by the value of the position of the leftmost "1." This scheme is implemented by programming a general purpose computer, and by special purpose hardware, both using shift registers and adding circuits.

6 Claims, 3 Drawing Figures

PROGRAM CONTROLLED PROCESSOR

INVENTOR
P. C. RICHARDS
BY R. O. Nimitz
ATTORNEY

NUMERICAL CONVERSION

FIELD OF THE INVENTION

This invention relates to electrical signal code conversion systems and methods and, more particularly, to the conversion of electrical signals from the two-out-of-six binary code to the ordinary or conventional binary code.

BACKGROUND OF THE INVENTION

In a modern industrial society, great amounts of digital information must be transmitted over long distances and utilized at remote sites for arithmetical or logical processing purposes. Although the conventional binary numbering system has proven very valuable for digital processing functions, it is not ideally suited for transmission purposes. Due to the difficulty in detecting errors which occur during the transmission of the conventional binary code, modified binary codes have been devised which greatly simplify the detection of errors. One such code is called the M-out-of-N code and is one in which a fixed number M out of a total number N of the binary bit positions are always "1's" and the remaining (N-M) binary bit positions are always "0's." The information is coded by the permutations of the positions of the M "1's" in the N-bit word format. One of the more common ones of the M-out-of-N codes is the so-called two-out-of-six code. In this case, two bit-positions out of a possible six bit-positions are always "1's" and the remaining four bit-positions are always "0's."

Because of the rules by which M-out-of-N codes are generated, errors causing bits to assume the opposite state are always detectable unless such errors cause complementary changes in pairs of bits. It is thus relatively simple to ascertain whether or not received code words are erroneous.

On the other hand, digital computations are most easily accomplished in the ordinary binary numbering system, and most digital processors are therefore arranged to process numerical information in the ordinary binary notation.

SUMMARY OF THE INVENTION

In accordance with the present invention, apparatus and methods are provided for translating between the M-out-of-N code and the ordinary binary code. In particular, by taking advantage of certain systematic properties of each of these codes, an extremely simple and rapid process can be implemented for carrying out this translation. More specifically, the locations of the binary bit positions of the "1's" in an M-out-of-N code bear a simple linear arithmetic relationship to the equivalent binary code. Indeed, the equivalent binary code is obtained by summing together the bit positions of the M "1's" in the M-out-of-N code, and a constant, shifted by an amount equal to the bit position of the leftmost "1" of the M-out-of-N code group.

The apparatus and methods of the present invention are particularly advantageous in applications which require large numbers of such translations to be implemented in very short times. One such application is the translation of the digits of a telephone number, keyed in the M-out-of-N code, into ordinary binary notation. Such translation may be useful in controlling the telephone switching network itself or in providing an interface between the telephone dialing instrument and a connected digital data processor.

These and other objects and features, the nature of the present invention and its various advantages, will be more readily understood from a consideration of the attached drawings and from the following detailed description of those drawings.

DETAILED DESCRIPTION OF THE DRAWINGS

The present invention is particularly useful in telephone switching systems under the control of a stored program digital data processor. Since two-out-of-six multifrequency signals are often used in the telephone network for telephone number signaling, such codes often must be converted to conventional binary notation for subsequent processing.

One electronic telephone switching system suitable for implementing the present invention is disclosed in the copending application of T. M. Quinn and F. S. Vigilante, Ser. No. 868,196, filed Oct. 21, 1969 and assigned to applicant's assignee. Other details of this system are disclosed in Vol. 48, No. 8, of The Bell System Technical Journal, Oct. 1969, pages 2,607 through 2,896. For convenience, a portion of the description of this system will be given here with the understanding that further details can be obtained from the above references.

Figure 1:
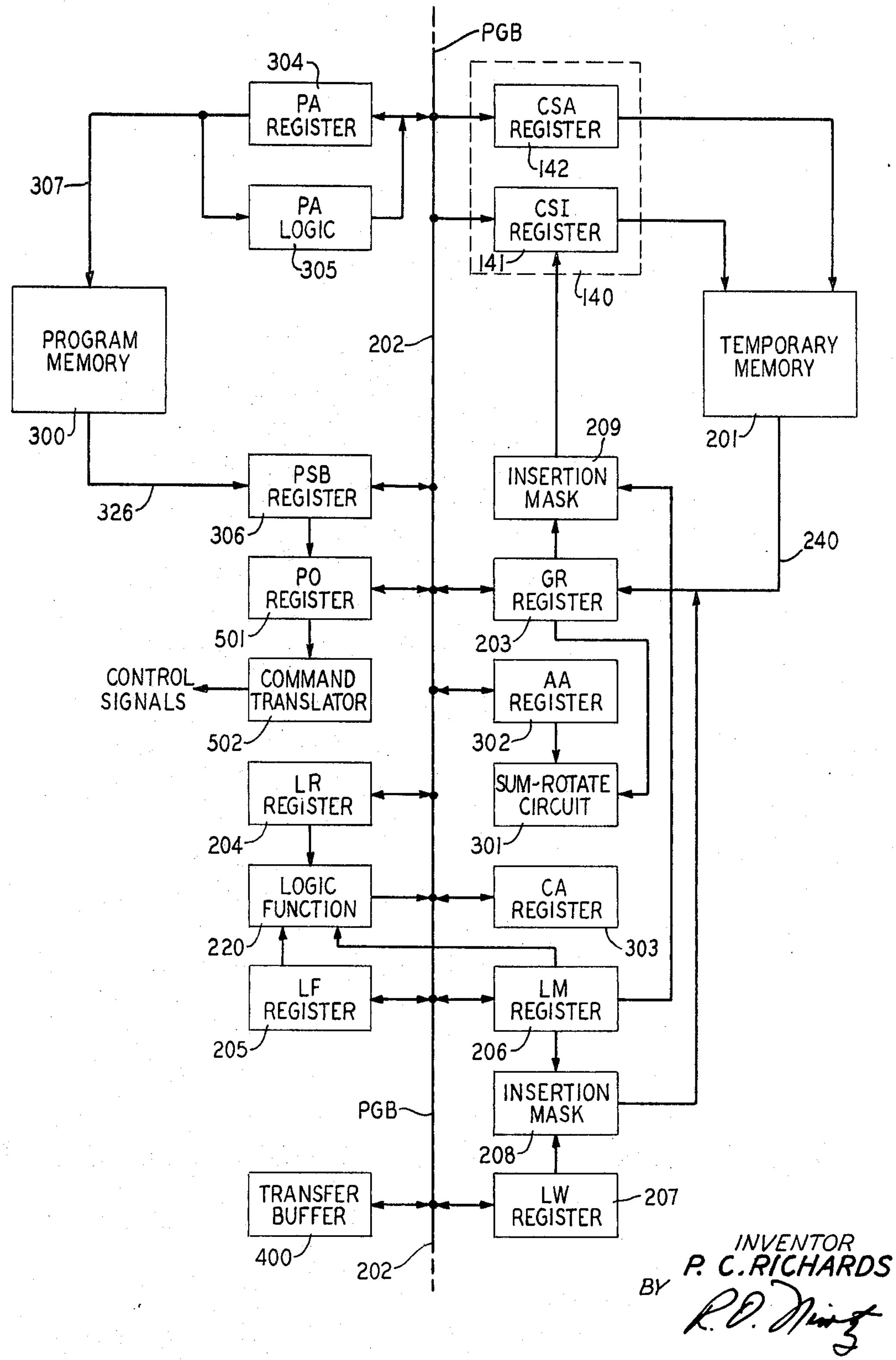
FIG. 1 is a schematic block diagram of a stored program digital computer useful in the implementation of the conversion system according to the invention using a programmed general purpose computer.

In FIG. 1 there is shown a block diagram of a program controlled processor suitable for use in an electronic telephone switching system such as that described above. The processor of FIG. 1 includes a program memory 300 and a temporary memory 201. There are two flip-flop registers within the program controlled processor of FIG. 1 which are associated with communications with the program memory 300, namely, the 18-bit PA register 304 and the 22-bit PSB register 306. The contents of the PA register 304 define the memory location to be accessed and the PSB register 306 stores instruction words or data obtained from the program memory 300 or data to be written into that memory. The PA register 304 is connected to the program memory 300 via cable 307. The PSB register 306 is connected to the program memory 300 via cable 326.

Instruction words are normally read from the program memory in sequence. Hence the contents of the PA register 304 are normally incremented by "1" prior to the reading of the next instruction. This is done under control of the PA logic 305. Occasionally, it is necessary to break the sequential chain and to make a transfer to a nonsequential address. For this purpose, the instruction repertoire includes a variety of transfer instructions which cause a transfer address to be gated into the PA register 304. The transfer address may be obtained from various sources within the program-controlled processor of FIG. 1.

The minimum time interval between successive readings of the program memory 300 is fixed by the circuit constants. It is desirable that this entire time be available to execute the instructions read from the memory. For this reason, the PO register 501 is provided in addition to the PSB register 306. At a predetermined time in the basic machine cycle, the contents of the PSB register 306 are gated to the PO register 501 for decoding. Thereafter, the contents of the PA register 304 are incremented by "1" and the newly generated memory address is transmitted to the program memory 300 to obtain the next instruction in sequence. In case the instruction in the PO register 501 is a transfer instruction, the transfer address rather than the next sequential address must be used in obtaining the next instruction from the program memory 300. If the next sequential address has already been read, but a transfer is to be executed, the contents of the PSB register 306 will then be discarded.

An instruction in the PO register 501 is decoded by means of the command translator 502, which produces output signals unique to the instruction found in the PO register 501. The output signals of the command translator 502 control the gating actions and logical operations taking place within the program-controlled processor of FIG. 1.

As shown in FIG. 1, the program-controlled processor contains a plurality of flip-flop registers. In general, the contents of any register can be gated to any other register in the processor. This transfer of information is accomplished by means of program gating bus 202. To transfer data by means of program gating bus 202 from one register to another, an output gate connected to the source register and an input gate connected to the destination register are both activated.

Many of the processor's registers are used primarily for specific functions; however, they are not limited to such use. For example, the AA register 302, the CA register 303, and the GR register 203 are all used primarily in communication with the temporary memory 201. A 15-bit address may be transmitted from either the AA register 302 or the CA register 303 to the CSA register 142 via program gating bus 202. Data to be written into the temporary memory 201 may be gated to the CSI register 141 from GR register 203 or from other registers by means of the program gating bus 202.

The temporary memory 201 is a destructive readout memory. Any memory location which is read by the processor must be regenerated to preserve the data for subsequent reading operations. The temporary memory 201 does not contain flip-flop registers for storing the data to be held for regeneration. Instead, data read from the memory is gated into the GR register 203 and regeneration data is obtained from the CSI register 141. A sufficient period of time is allowed between the reading and regeneration that the read data can be gated to the CSI register 141 from the GR register 203.

The LR register 204, the LF register 205, the LM register 206, and the LW register 207 are used in conjunction with instructions which perform a variety of logical operations. The logic function circuit 220 is employed by these instructions. Generally, the contents of the GR register 203 and of the LR register 204 are combined in accordance with the logical function specified by the contents of the LF register 205. The contents of the LM register 206 are used in the logic function circuit 220 to selectively mask certain bits such that the logic function will be performed only on those bits of the input words for which there exists a "1" in the LM register 206, and a "0" will be generated for all bits for which there exist a "0" in the LM register 206. The resultant data word generated by the logic function circuit 220 is gated to the LW register 207 via the program gating bus 202.

If it is desired that the bits on which a logic function has been performed be returned to the GR register 203 but that all other bits of GR register 203 not be disturbed, the insertion mask circuit 208 is employed. This selective insertion into the GR register is accomplished by single rail gating of the "1" side of each bit of the LW register 207 to the GR register 203 via the program gating bus 202, and simultaneously combining the contents of the LM register 206 and the "0" side of each bit of the LW register 207 and gating the result to the "clear" side of each bit of the GR register 203. As a result, a "1" is written into each bit of the GR register 203 for which there was a "1" in the LW register 207, and a "0" is written in each bit of the GR register for which there exists a "1" in the LM register 206 and a "0" in the LW register 207. It should be remembered that a "1" can appear only in those bits of the LW register 207 for which there was a "1" in the LM register 206. Consequently, a change is made in only those bits of the GR register 203 for which there exists a "1" in the LM register 206.

The sum-rotate circuit 301 is a logic circuit which is used for several purposes. This circuit may be used to rotate the contents of GR register 203 a specified amount by gating the contents of the GR register 203 to the sum-rotate circuit 301 via the program gating bus, and by gating the rotated result back to the GR register 203. The sum-rotate circuit 301 is also used to add the contents of the GR register 203 and the AA register 302. The results are then placed in the AA register 302.

In Table I there is shown a conversion subroutine for practicing the present invention which can be stored in object code form in the program memory 300 of FIG. 1.

TABLE I

Conversion Subroutine

| | | | |
|---|---|---|---|
| | AND | 77 | MSK out all but lower 6 bits in GR |
| | COMSG | | Compl contents of the GR |
| | ZAA | | Clear the AA register |
| | FLZT | 5 | 1st O loc (L1) to AA;set TST FLG |
| | TCNS | Error | Transfer if TST FLG not set |
| | AAXLR | | Save L1 in the LR register |
| | FLZT | 5 | 2nd O loc (L2) to AA;set TST FLG |
| | TCNS | Error | Transfer if TST FLG not set |
| | COMS | | Compl GR;set TST FLG if all 1's |
| | TCNS | Error | Transfer if TST FLG not set |
| | AAXRF | | Load L2 into RF register |
| | LGR | /0/30000 | Load C into GR |
| | RGLO | | Rotate GR LFT by 2's compl of RF |
| | ADD | | Add C2 in GR to L2 in AA |
| | LRXGR | | Move L1 from LR to GR |
| | ADD | | Add L1 in GR to (C2+L2) in AA |
| | AAXGR | | Move binary result from AA to GR |
| | AND | 17 | MSK out all but lower 4 bits in GR |
| Return | TTSA | | Return to calling program |
| Error | ZGR | | Clear GR |
| | TR | Return | Transfer to "return" |
| | END | | |

This program listing may be interpreted as follows:

The instruction at line 3 masks out all but the lower order (right-most) six bits in GR register 203.

The instruction at line 4 complements the contents of GR register 203. This permits a search for "0's" instead of "1's" in the two-out-of-six code.

The instruction at line 5 clears the contents of AA register 302.

The instruction at line 6 looks from right to left through the first six bit positions in GR register 203 for the first "0." The location of this first "0," which can be identified as the quantity "L1," is placed in AA register 302. At the same time, a test flag is set in a flip-flop in transfer buffer 400. An example of an implementation of instructions similar to this instruction is found in E. J. Pasternak U.S. Pat. No. 3,395,396, granted July 30, 1968.

The instruction at line 7 tests to see if this flag has been set and, if not, transfers to the location "ERROR" at line 22. This transfer indicates that no "1" was present in the original two-out-of-six code and thus an error has occurred. If the flag has been set, the instruction at line 8 is executed, transferring the value of L1 from AA register 302 to LR register 204, thus saving this value for future use.

At line 9, the instruction "FLZT" locates the second "0" from the right in GR register 203, corresponding, of course, to the second "1" of the two-out-of-six code. The value "L2" of the position of this bit is stored in AA register 302 and the test flag is set. At line 10 the flag is tested to see if the second "1" was present in the original two-out-of-six code. If not, a transfer is taken to the location "ERROR" at line 22.

At line 11, the contents of GR register 203 are complemented and the test flag is set if all "1's" were present in GR register 203 before complementing. If the original code word erroneously had more than two "1's," a zero will remain in GR register 203 at the execution of the instruction at line 11. This condition is detected by the execution of the instruction at line 12 and a transfer is taken to the "ERROR" location at line 22.

At this point, it will be seen that a number resides in LR register 204 corresponding to L1, the location of the right-most "1" in the two-out-of-six code. The AA register 302, in turn, contains the value of L2, the location of the second right-most "1" in the original two-out-of-six code. These quantities are used as hereinafter described to calculate the binary equivalent of the two-out-of-six code. The following Table II is useful in understanding the arithmetic operations necessary to calculate the binary equivalents. Table II represents the keys which generate particular two-out-of-six codes, the corresponding values of L1 and L2, the value of "C2," to be described hereinafter, and the binary equivalent ("Sum"). The use of these values will be explained hereinafter.

TABLE II

| Key | 2/6 Code | L1 | Binary (Decimal) L2 | C2 | Sum |
|---|---|---|---|---|---|
| 1 | 000011 | 0000(0) | 0001(1) | 0000(0) | 0001(1) |
| 2 | 000101 | 0000(0) | 0010(2) | 0000(0 ) | 0010(2) |
| 3 | 000110 | 0001(1) | 0010(2) | 0000(0) | 0011(3) |
| 4 | 001001 | 0000(0) | 0011(3) | 0001(1) | 0100(4) |
| 5 | 001010 | 0001(1) | 0011(3) | 0001(1) | 0101(5) |
| 6 | 001100 | 0010(2) | 0011(3) | 0001(1) | 0110(6) |
| 7 | 010001 | 0000(0) | 0100(4) | 0011(3) | 0111(7) |
| 8 | 010010 | 0001(1) | 0100(4) | 0011(3) | 1000(8) |
| 9 | 010100 | 0010(2) | 0100(4) | 0011(3) | 1001(9) |
| 0 | 011000 | 0011(3) | 0100(4) | 0011(3) | 1010(10) |
| ST3P | 100001 | 0000(0) | 0101(5) | 0110(6) | 1011(11) |
| STP | 100010 | 0001(1) | 0101(5) | 0110(6) | 1100(12) |
| KP | 100100 | 0010(2) | 0101(5) | 0110(6) | 1101(13) |
| ST2P | 101000 | 0011(3) | 0101(5) | 0110(6) | 1110(14) |
| ST | 110000 | 0100(4) | 0101(5) | 0110(6) | 1111(15) |

At line 13 of Table I, the value of L2 is moved from AA register 302 to sum-rotate circuit 301. At line 14, a constant value C is loaded into GR register 203. This constant is a binary "3" displaced two binary bit positions from the left-most end of GR register 203. This can be best seen in FIG. 2 where box 203 simulates the contents of GR register 203.

The instruction at line 15 causes the contents of GR register 203 to be rotated left by the contents of sum-rotate circuit 301. It will be recalled that this value is L2, the position of the second "1" in the two-out-of-six code.

Figure 2:
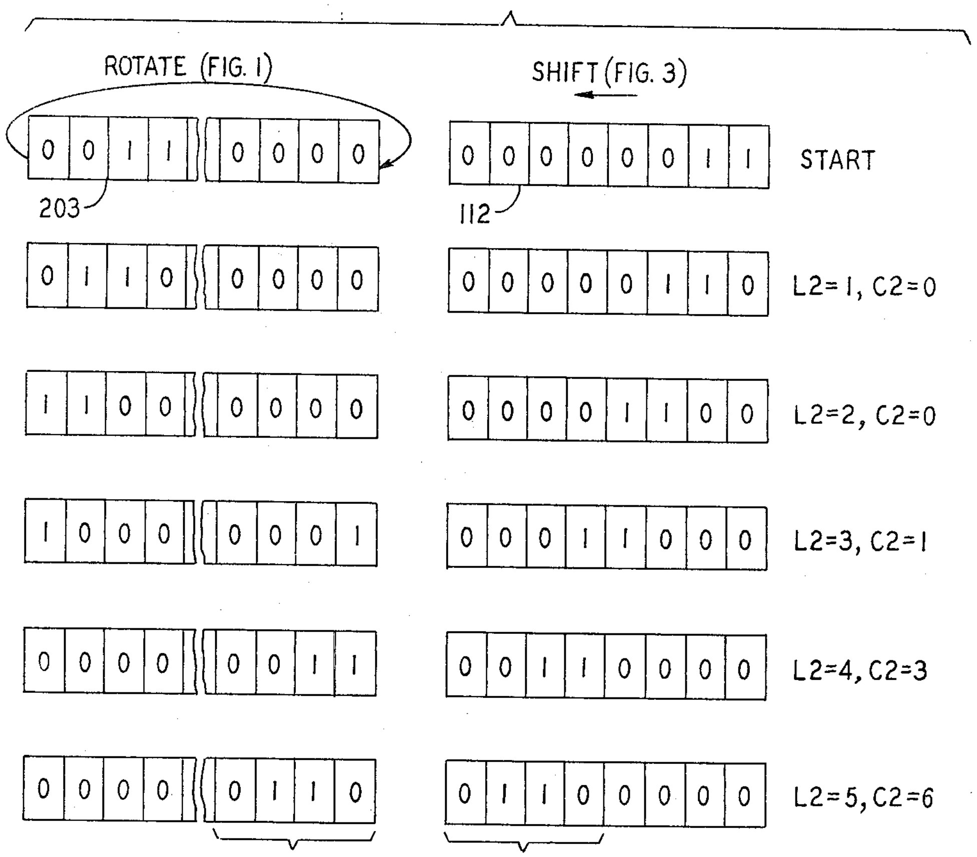
FIG. 2 is a schematic diagram of the contents of one of the registers of FIG. 1 and of FIG. 3, respectively, useful in understanding the operation of these implementations.

The resulting contents of GR register 203 are shown in the left-most column of FIG. 2 where L2 has the values specified in the right-hand column of FIG. 2. It can be seen that the right-most four bit positions of GR register 203 contain the binary representation of a value C2 representing the initial value "C" rotated by the value of L2. The value of C2 now appearing in GR register 203 is added to the value of L2 previously stored in AA register 302. This is accomplished by the instruction at line 16 of Table I.

At line 17 of Table I, the value of L1 in LR register 204 is moved to GR register 203 and at line 18, is added to the sum of C2 and L2 in AA register 302.

As can be seen from the right-most column of Table II, this sum now in AA register 302 represents the binary equivalent of the original two-out-of-six code. At line 19, this binary equivalent is moved from AA register 302 to GR register 203 and at line 20, all but the lower order four bits in GR register 203 are masked out. At line 21, a return is taken to the calling location of the main routine.

The "ERROR" location at line 22 clears the contents of GR register 203 and at line 23 executes a transfer to the instruction at line 21, thus accomplishing a return to the calling routine with GR register 203 completely empty. This indicates that an error was found in the original code to be converted.

Figure 3:
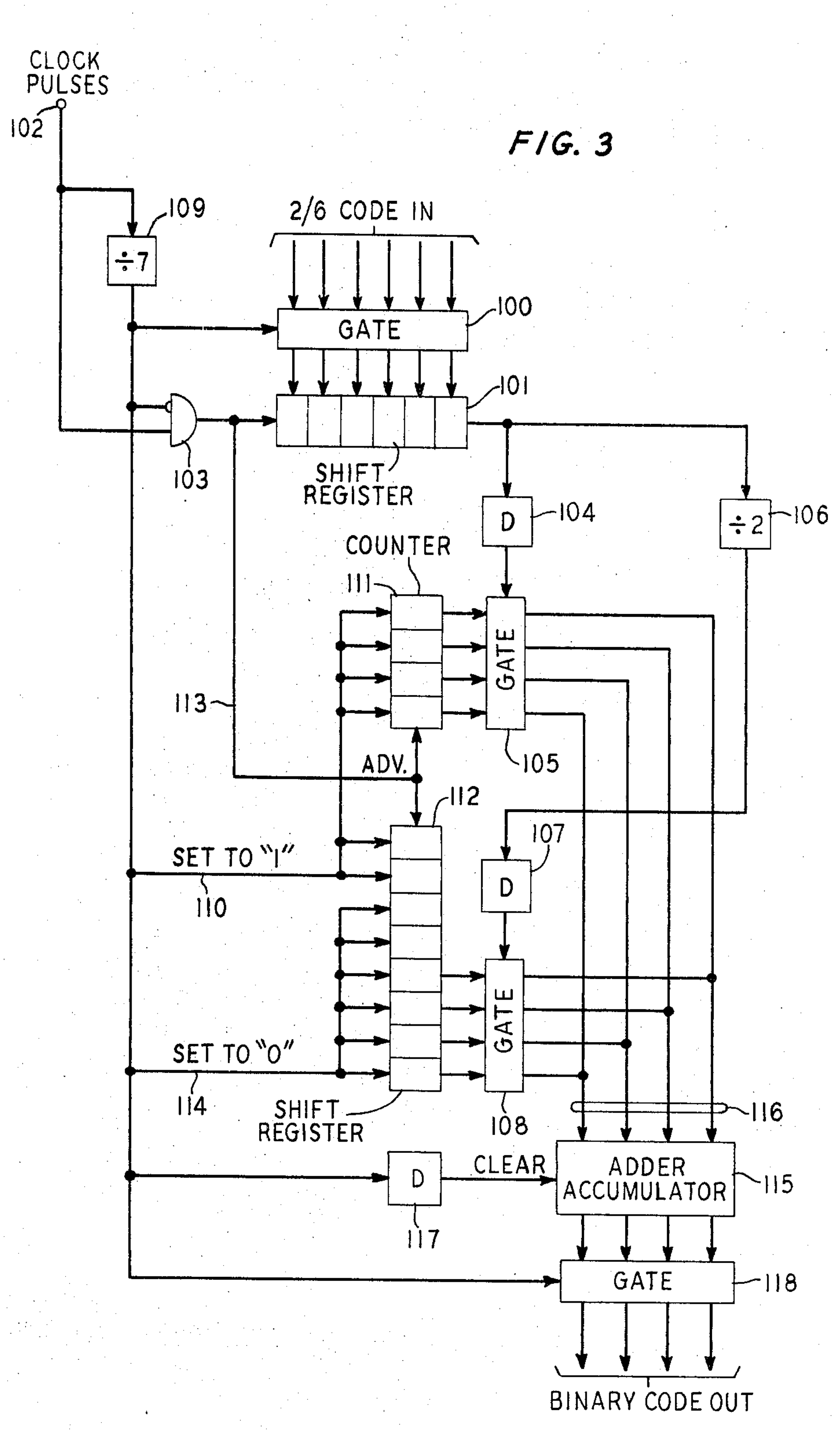
FIG. 3 is a detailed block diagram of a special purpose digital circuit useful in another implementation of the conversion system of the present invention.

In FIG. 3, there is shown a detailed circuit arrangement for implementing the same operations discussed above with respect to a programmed general purpose computer. In FIG. 3, the signals representing the two-out-of-six code are applied by way of gate 100 to a six-place shift register 101. Clock pulses are applied by way of input terminal 102 and inhibiting gate 103 to advance the binary signals in shift register 101. Output signals from shift register 101 are applied by way of delay circuit 104 to gate 105 and by way of pulse divider circuit 106 and delay circuit 107 to gate 108. Binary "1" signals shifted out of shift register 101 are thereby applied by way of delay circuit 104 to operate gate 105. Inasmuch as pulse divider circuit 106 divides incoming pulses by two, every other pulse appearing on the output of shift register 101 is applied by way of delay line 107 to gate 108.

Clock pulses at terminal 102 are also applied to pulse divider circuit 109 which produces one output pulse for each seven input pulses delivered to it. The output of divider circuit 109 is applied to inhibit gate 103 to inhibit the passage of every seventh clock pulse applied to terminal 102. This seventh clock pulse forms the division between successive cycles of the entire circuit of FIG. 3. Thus, this seventh clock pulse from divider circuit 109 is used to enable gate 100 to pass a new two-out-of-six binary code group to shift register 101. This seventh clock pulse is also applied by way of lead 110 to preset counter circuit 111 and shift register 112.

Counter 111 is a four-place binary counter which counts clock pulses appearing on lead 113. At the beginning of each cycle, the seventh clock pulse on lead 110 sets all of the stages of counter 111 to the "1" condition. The next clock pulse on lead 113 therefore recycles counter 111 to the all "0's" condition and thereafter input clock pulses are counted in the ordinary manner.

The seventh clock pulse on lead 110 also sets the first two stages of the eight-place shift register 112 to "1" and, on lead 114, sets the last six places of shift register 112 to zero. Thereafter, clock pulses on lead 113 advance the bit pattern "00000011"one place (to the left) for each clock pulse.

An adder-accumulator circuit 115 is provided to add the binary input signals on leads 116 to the contents of an accumulator register contained therein and to store this sum in the accumulator register. The seventh clock pulse is applied by way of delay circuit 117 to clear this accumulator register. The seventh clock pulse is also applied to operate output gate 118 to gate the contents of the accumulator register to the output circuits.

The circuit of FIG. 3 operates as follows: A fully verified two-out-of-six code is represented by signals applied to input gate 100. These signals are gated by gate 100 into shift register 101 during every seventh clock pulse. At the same time, counter 111 and shift register 112 are preset to the above-described conditions, the previous results are gated out of adder-accumulator 115 by gate 118 and, after a delay in delay circuit 117 to permit the output to be gated out, adder-accumulator 115 is cleared. Succeeding clock pulses, by way of terminal 102 and inhibit gate 103, advance the two-out-of-six bit pattern in shift register 101 to the right and, at the same time, advance counter 111 and advance the bit pattern in shift register 112.

It can be seen that shift register 101, counter 111 and shift register 112 are all advanced in synchronism by the same clock pulses. Thus, when the first output pulse appears from shift register 101, the count in counter 111 will have counted to the binary equivalent of the bit position of the first binary "1" from shift register 101 (L1). After a short delay in delay circuit 104 to allow counter circuit 111 to settle, this binary equivalent is gated by way of gate 105 to adder-accumulator circuit 115 where the zero in the cleared accumulator register is added to this binary equivalent and the result, the binary equivalent L1 itself, is stored in the accumulator register.

As clock pulses continue to be applied to shift register 101, the second "1" of the binary bit pattern is likewise applied by way of delay line 104 to gate the binary equivalent of this second bit position (L2) from counter 111, by way of gate 105, to adder-accumulator circuit 115. This binary equivalent L2 of the second bit position is added to the already-stored binary equivalent L1 of the first position and the sum (L1+L2) is stored in the accumulator register of the adder-accumulator 115.

The second output pulse from shift register 101 also causes divider circuit 106 to emit a pulse which is applied by way of delay circuit 107 to gate 108. Delay circuit 107 provides a somewhat longer delay than delay circuit 104 to permit gate 108 to operate after gate 105 and thus prevent interference. The bit pattern appearing in the four higher order bit positions of shift register 112 are thereby gated to adder-accumulator 115 and thus added to the sum already there. The numerical value represented by this bit pattern and the bit pattern itself is identical to that described with reference to FIG. 1 and identified as C2, and is illustrated in the center column of FIG. 2. That is, if the second bit in the two-out-of-six code appears in the second or third bit position, (i.e., L2 = 1, 2), the numerical value (C2) is zero. If the second bit of the two-out-of-six code appears in the fourth, fifth or sixth bit position (L2 = 3, 4 or 5), the numerical value C2 in shift register 112 is 1, 3 or 6, respectively. As noted in connection with Table II, the sum of the two bit positions L1 and L2, as supplied by counter 111, together with the shifted contents C2 in shift register 112, is equal to the binary equivalent of the entire two-out-of-six code. This binary number in adder-accumulator 115 is gated out by way of gate 118 during every seventh clock pulse.

It can be seen that the circuit of FIG. 3 implements the same process implemented by the computer program described in connection with FIG. 1. Although the circuit of FIG. 3 is a useful alternative to the program-controlled circuits of FIG. 1, such program-controlled circuits implement the processes of the present invention in the preferred mode. This is true because the circuits of FIG. 1 need not be dedicated to the performance of this process but, indeed, may participate in many other useful processes. The embodiment of FIG. 3, on the other hand, can be used only to perform the prescribed conversion and can perform no other significant function.

What is claimed is:

1. The method of converting digital signals coded in a two-out-of-six code into digital signals coded in the ordinary binary code comprising the steps of:

1. generating ordinary binary signals representing the value of the displacement of each of said two digital signals from a fixed position,
2. shifting a constant "11" binary signal by a number of places equal to the ordinary binary value of one of said displacements of step (1), and
3. algebraically adding the signals representing said displacement values from step (1) and the shifted constant from step (2) to produce an ordinary binary coded signal equal to said two-out-of-six coded signal.

2. The machine method of converting from the two-out-of-six code to the ordinary binary code comprising the machine-implemented steps of:

1. generating the ordinary binary code equivalent of the bit positions of the two ones in said two-out-of-six code,
2. shifting the bit pattern "11" to the left by the value of said ordinary binary code equivalent of the left-most one in said two-out-of-six code, and
3. algebraically adding ordinary binary representations of said bit positions and the ordinary binary number represented by said shifted bit pattern.

3. The machine conversion method of claim 2 wherein said step of generating bit position code equivalents further includes the steps of:

a. complementing said two-out-of-six code,
b. finding the right-most zero in said complemented code,
c. changing said right-most zero to a one, and
d. finding the right-most zero in said changed complemented code.

4. The machine conversion method of claim 2 wherein said step of generating bit position code equivalents further includes the steps of:

a. shifting said two-out-of-six code to the right in synchronism with the advancement of a binary count, and
b. reading said binary count at the detection of each one in said shifted two-out-of-six code.

5. A code converter for converting two-out-of-six code to ordinary binary code comprising:

means for generating the ordinary binary code equivalent of the bit positions of the ones in said two-out-of-six codes,
means for shifting the bit pattern "11" to the left by the value of said ordinary binary code equivalent of the left-most one in said two-out-of-six code, and
means for algebraically adding said ordinary binary code equivalents and the ordinary binary code represented by said shifted bit pattern.

6. The code converter according to claim 5 wherein each of the means therein recited comprises apparatus elements permanently interconnected together.

* * * * *